Nov. 10, 1931.   G. S. WITHAM, JR   1,831,642
PROCESS AND APPARATUS FOR PULPING
Filed Dec. 14, 1927   2 Sheets-Sheet 1
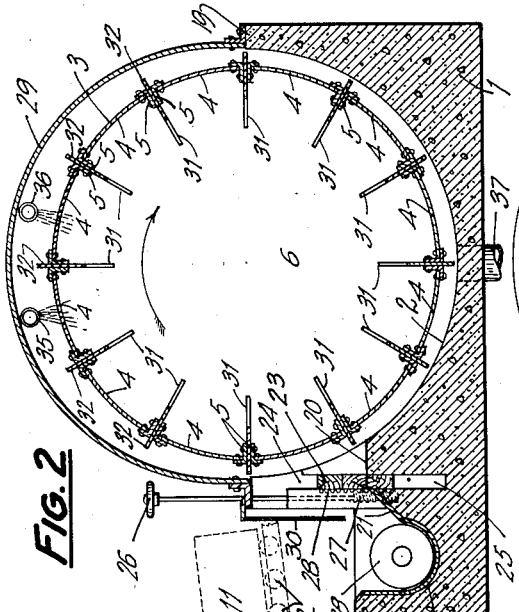
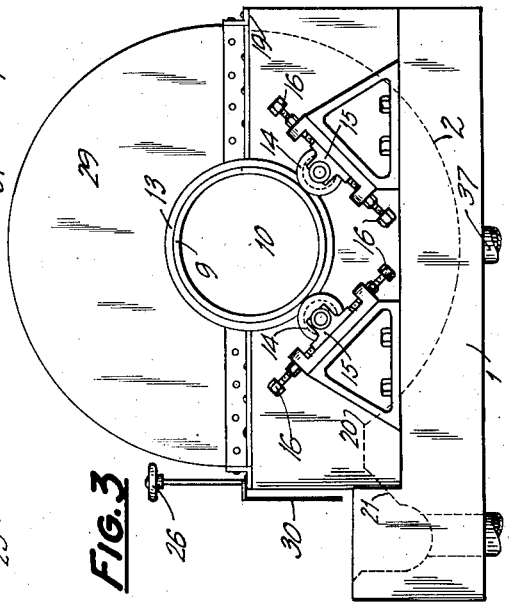
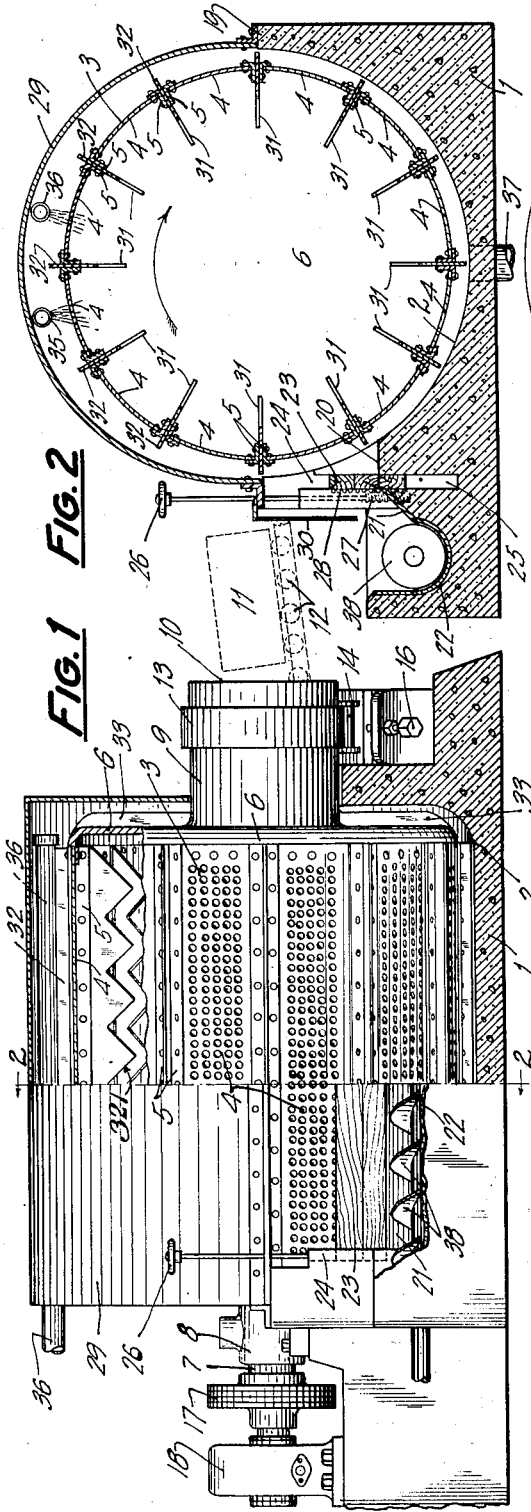
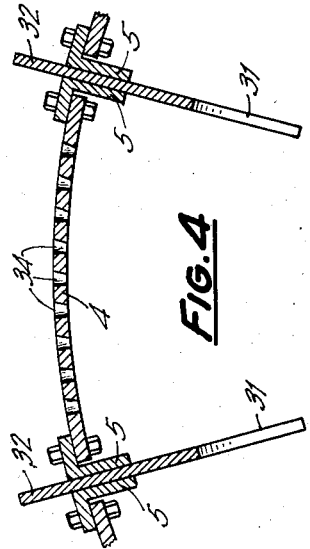
INVENTOR
George Stanford Witham Jr.
By
ATTORNEY Nov. 10, 1931.                G. S. WITHAM, JR                    1,831,642
                      PROCESS AND APPARATUS FOR PULPING
                          Filed Dec. 14, 1927        2 Sheets-Sheet 2

INVENTOR
George Stanford Witham Jr.
By
ATTORNEY

Patented Nov. 10, 1931

1,831,642

UNITED STATES PATENT OFFICE

GEORGE STANFORD WITHAM, JR., OF HUDSON FALLS, NEW YORK

PROCESS AND APPARATUS FOR PULPING

Application filed December 14, 1927. Serial No. 239,965.

My invention relates to pulping and disintegrating and particularly to these processes as practiced in the art of paper making. It relates to the method and apparatus for breaking up hard materials such as baled pulp, old news or board stock, kraft, sulphite and ground wood sheet or lap stock, or the like, and thus preparing the material for further treatment.

The present practice in breaking up hard stock preparatory to subjecting it to further treatment, is to first cut the material into short shreds by feeding it against revolving knives in what is termed a shredder. The shredded stock is then mixed with water in a suitable chest, and the mixture delivered to the beaters as required. The stocks which are now being delivered to the mills are bone dry and hard, and shredding in this way not only requires a great deal of hand labor, and an excessive amount of power, but the action of the knives cuts rather than separates the fibers so that many of them are rendered too short for the purpose for which they are intended. Moreover, because of being shredded in a bone dry state, a great deal of dust is created which increases the fire hazard about the mill.

I propose to proceed in a somewhat different way whereby the individual fibers are preserved substantially intact, and whereby the disintegration and hydration of a mass of material, regardless of its bulk, is carried on simultaneously.

The objects of my invention, generally, are to provide an apparatus and a method of procedure whereby hard materials may be broken up and pulled with a minimum of power and labor. More specifically, an object is to provide an apparatus and method of procedure whereby the pulping of such materials may be conducted on a much larger scale than is possible at present, and whereby the process may be made a substantially continuous one. Another object is to provide an apparatus and method of procedure whereby hard materials are disintegrated and simultaneously mixed with water, and whereby a continuous flow of prepared material from the pulper may be maintained. And a further object is to provide an apparatus and method of procedure whereby the particles of stock in the resulting mixture may be limited to a definite maximum size, and in which the consistency of the mixture may be controlled to a considerable extent.

With these objects in view my invention includes the novel procedure described below, and the novel elements and the arrangements and combinations of these and other elements described herein and illustrated in the accompanying drawings in which—

Fig. 1 is a view of my apparatus partly in side elevation and partly in section with certain portions broken away or removed to show the details of construction;

Fig. 2 is a section of Fig. 1 in the plane 2—2;

Fig. 3 is an end elevation as seen from the right hand side of Fig. 1;

Fig. 4 is a detail of a fragmentary section of the drum drawn to a somewhat enlarged scale;

Figure 5:
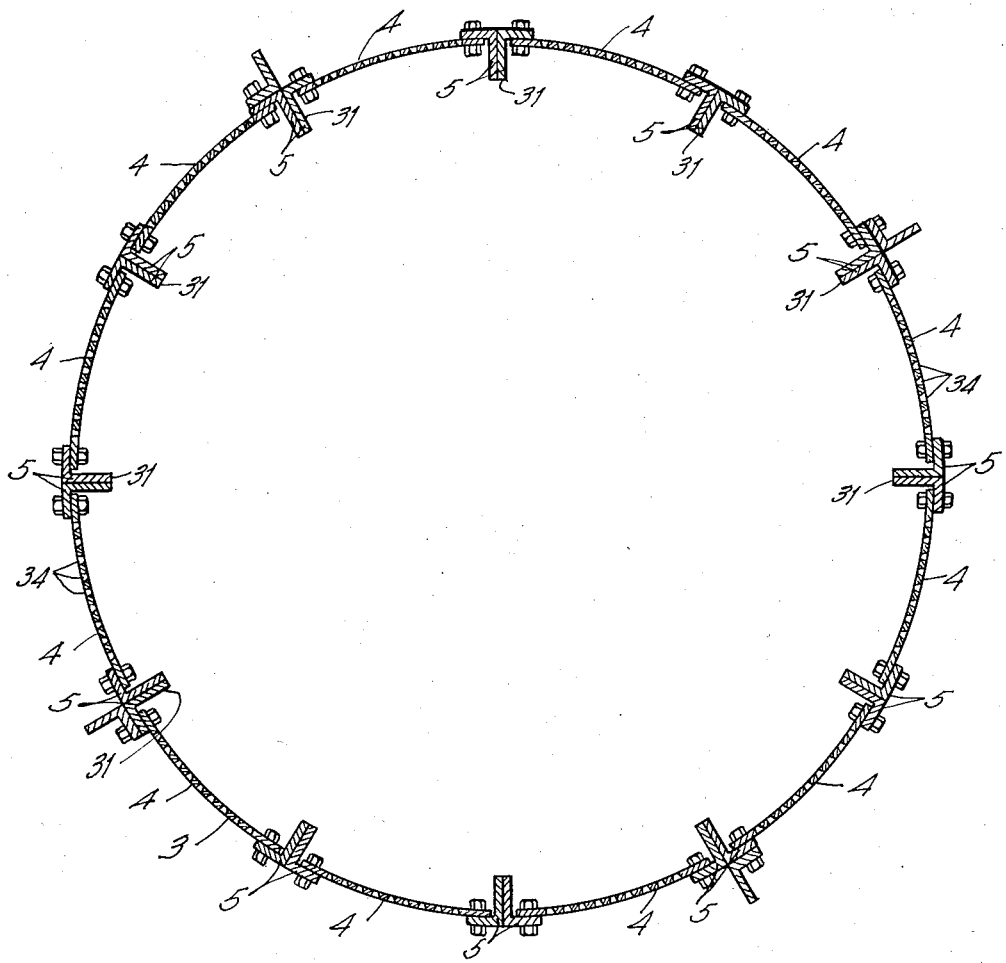
Fig. 5 is a cross section of a modified form of drum.

Referring particularly to the drawings, 1 represents a tank which is shown as though constructed of concrete but which may, of course, be of any suitable material. The inside surface, 2, of this tank is preferably cylindrical and subtends a central angle of something less than 180 degrees for reasons which will be later explained. Axially mounted to rotate with its lower periphery in this tank is a drum represented generally by the numeral, 3. This drum may be of any required length and diameter depending upon the capacity desired, and merely for the purpose of discussion and illustration may be said to be thirty or more feet in length and ten or more feet in diameter. This drum is illustrated as cylindrical in form and fabricated from a plurality of perforated plates or screens, 4, which are bolted, riveted or otherwise secured together by means of angles, 5. It will be understood that the drum is closed at each end by a head, 6, to which the angles and plates are secured. The head at the left end of the drum, as viewed in Fig. 1, is entirely closed and is provided with a centrally disposed shaft, 7, supported in a bearing, 8, which is provided with a combination thrust and oil ring, (not shown). The head at the right hand end of the drum, as viewed in Fig. 1, is also provided with an axial shaft, 9. This shaft is comparatively large in diameter and hollow to provide an opening, 10, extending into the interior of the drum and through which, bulky materials to be pulped may be introduced. The internal diameter of this opening should be sufficient to permit the free passage of large objects such as bales of pulp, 11, or the like which may be introduced conveniently by a conveyor, 12, extending into the opening, 10.

Any suitable bearing may, of course, be provided for the shaft, 9, and I have illustrated one type in Fig. 3. For example, a hardened steel ring, 13, may be shrunk about the shaft, 9, and this ring may ride upon and be supported by the flanged rollers, 14. These rollers are supported in suitable bearings, 15, and adjusting screws, 16, are provided for aligning the bearings.

The shaft, 7, may be driven by any suitable source of power, but it will be found very satisfactory to connect this shaft through a flexible coupling, 17, to a worm type reduction gearing, 18, which in turn is connected to a suitable electric motor. This motor should turn the drum in the direction of the arrow shown in Fig. 2.

Referring now more particularly to the construction of the tank in which the drum turns, and which is perhaps best illustrated in Fig. 2, it will be noted that at the rear of the drum the tank is carried up to about the level of the axis of the drum as shown at 19. At the front, the side of the tank extends upward only a short distance from the bottom, as shown at 20, to provide a sort of spillway, 21, extending downwardly into a longitudinal trough, 22, running along the front of the machine. Extending across the top of the spillway, 21, is an adjustable gate or dam, 23, which may be raised or lowered to vary the height of the crest. This gate or dam, for illustrative purposes is shown as sliding in grooves, 24, in the walls at each end of the spillway and in a groove, 25, extending down into the concrete forming the tank. Some means, such as hand wheels, 26, provided with worms, 27, coacting with racks, 28, on the dam, should be provided at each end whereby the dam or gate may be readily adjusted to the desired height.

A cover, 29, is provided which extends entirely over the upper half of the drum so that the only opening is between the crest of the dam and the lower edge of this cover. A plate or curtain, 30, (see Figs. 2 and 3) extending across the front of the machine and below the crest of the gate, may be provided to deflect the material flowing over the gate downwardly into the trough.

In the type of drum illustrated in Figs. 1, 2 and 4 a plurality of inwardly extending baffles, 31, are provided, and the exterior periphery is provided with a plurality of paddles or scrapers, 32, which act as wipers to clear the interior of the tank, as will be later explained. To clear the ends of the tank, wipers, 33, are provided on each head of the drum. The baffles, 31, may be of a variety of lengths and shapes depending upon the character of the materials to be handled. The function of these baffles is to provide a roughened interior for the drum which will repeatedly turn the masses of material to be pulped and subject them to abrasion. These baffles may be comparatively long, as shown in Fig. 2 to provide buckets or pockets in which masses of material will be carried around to the upper portion of the drum before they are dropped, so that the material is subjected to shock in this way. To facilitate the breaking or rending of large masses, these baffles may, if desired, be serrated as shown at 321 (see Fig. 1). On the other hand, these baffles may be comparatively short, as shown in Fig. 5, so that the action upon the material is mostly abrasive without any substantial lifting or dropping. These features are all subject to many modifications adapting them to act most efficiently upon the particular material to be handled.

Some means of supplying water to the tank, 1, should be provided, and I prefer to introduce it in the form of a spray or shower directed against the outer periphery of the drum itself which will tend to clear the perforations of any obstructions. This particular arrangement of the water supply, however, is not essential, and screen plates having tapered or splayed perforation, 34, as illustrated in Fig. 4, will not clog. Between the cover and the drum, at the top, I have provided two perforated pipes, 35 and 36, through which either hot or cold water may be supplied. I have also illustrated a drain pipe, 37, controlled by a suitable valve, not shown, through which the tank may be flushed.

In the operation of my device, large masses, such as bales or laps, of the material to be pulped may be introduced into the drum through the opening, 10. The drum is turned in the direction of the arrow shown in Fig. 2, and water is supplied through the shower, 35 and 36. The material is constantly tumbled about in the drum and subjected to shock and abrasion which rapidly disintegrates the large masses. The depth of the water in tank, 1, is regulated by the adjustable gate, 23, and the quantity of water supplied to the tank may be regulated with a suitable valve to obtain the most efficient operation. As the disintegrating progresses the smaller particles take on water and eventually are sieved through the screen plates and carried over the crest of the dam into the trough, 22. Here a screw conveyor, 38, may be provided for carrying the stock to such points as may be required.

Figure 6:
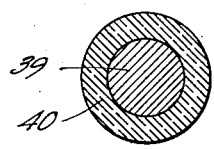
Fig. 6 is a section showing one form of element with which my drum may be supplied to effect a pounding and disintegration of the material.

In effecting a pulping of some classes of material it will be advantageous to charge the drum with masses of another material of less mutable character than that to be pulped. For example, short logs or blocks of hardword, "hard heads", or iron blocks or balls, 39, covered with rubber, 40, (see Fig. 6) may be introduced into the drum and tumbled together with the material to be pulped, thus providing additional means for pounding and abrading the stock.

It will be evident from the foregoing that my device functions without impairing the length or strength of the individual fibers in any way. Disintegration of the bulky masses is accomplished by shock and abrasion rather than by cutting, and the fibers and smaller particles are gradually dissolved from the larger masses and carried away in liquid suspension.

It is obvious that my process or method of procedure is in no sense limited to the apparatus described or illustrated, nor is it limited in its application to pulp alone or to large and bulky masses of any material. On the contrary, it may be used to disintegrate masses of any size and will be found extremely useful in the reduction and pulping of old news stock, old board stock and any other like material susceptible to disintegration by moderate shock and abrasion and having a specific gravity not greatly exceeding unity.

It therefore is to be understood that the drawings accompanying this specification are merely illustrative, that the words which I have used in describing my invention are words of description and not of limitation, and that changes within the spirit of the appended claims may be made without departing from my invention in its broader aspects.

What I claim is—

1. A pulping machine comprising a tank, a drum having openings in the periphery thereof and mounted to rotate with the lower portion thereof in said tank, an adjustable dam adapted to control the depth of liquid in the tank, and means adapted to sweep the liquid contents of said tank over the crest of said dam.

2. In a pulping machine, the combination with a rotatively mounted foraminous drum adapted to receive the material to be pulped, of a tank surrounding the lower portion of the drum and provided, on one side of said drum, with means adapted to regulate the depth at which said tank will overflow, means adapted to provide a continuous flow of water to said tank, and means on said drum for sweeping the liquid contents of said tank over the side thereof.

3. The process of reducing directly to pulp large masses, such as bales or laps of fibrous material, which comprises subjecting the masses, without preliminary reduction in size, to abrasion and shock in the presence of water in a suitable container to effect a disintegration thereof, segregating the particles up to a predetermined size without removing them from the water, and thereafter removing the segregated particles in liquid suspension.

4. The process of reducing directly to pulp large masses, such as bales or laps of fibrous material, which comprises subjecting the masses, without preliminary reduction in size, to abrasion and shock in the presence of water by repeatedly lifting, dropping and tumbling them together to effect a disintegration thereof, and removing the particles of disintegrated material from the general mass by flushing with water.

5. The process of reducing directly to pulp large masses, such as bales or laps of fibrous material, without preliminary reduction in size, which comprises tumbling the masses in a suitable container with free masses of a less mutable material, and continuously removing the smaller particles in liquid suspension by maintaining a flow of water through the disintegrating material.

6. In a pulping machine, the combination with a rotating foraminous drum closed at one end but provided at the other end with an opening of a size sufficient to admit large masses, such as bales or laps of fibrous material, without preliminary reduction in size, and having projections upon the interior thereof extending longitudinally throughout the major portion of said drum, of a tank below said drum, and means for supplying water to said tank through said drum, whereby the smaller particles of material are flushed through the foraminæ into said tank.

7. In a pulping machine of the character described, a rotating drum provided at one end with an opening of sufficient size to admit large masses, such as bales or laps of fibrous material, without preliminary reduction in size, and having a plurality of baffles extending inwardly from the periphery of said drum to form pockets extending throughout the major portion thereof for picking up and carrying said masses a substantial distance above the bottom of said drum before dropping them, and means for admitting water to said drum.

8. In a pulping machine, the combination with a rotating, foraminous drum provided with a plurality of projecting elements distributed substantially throughout the interior peripheral surface thereof whereby the material is broken up and disintegrated as the drum is rotated, of means for intermixing the material with water and effecting a removal of the smaller particles thereof in liquid suspension.

9. A pulping machine comprising a tank having a spillway therein, a foraminous drum having a roughened interior closed at one end but provided at the other end with an opening sufficient in size to admit large masses, such as bales or laps of fibrous material, mounted to rotate in said tank, means for supplying water to said tank, and means for raising and lowering the crest of said spillway.

GEORGE STANFORD WITHAM, Jr.